(12) United States Patent
Chuang

(10) Patent No.: US 9,255,707 B2
(45) Date of Patent: Feb. 9, 2016

(54) ILLUMINATED WATER BOTTLE CAGE

(71) Applicant: Louis Chuang, Taichung (TW)

(72) Inventor: Louis Chuang, Taichung (TW)

( * ) Notice: Subject to any disclaimer, the term of this patent is extended or adjusted under 35 U.S.C. 154(b) by 39 days.

(21) Appl. No.: 14/256,009

(22) Filed: Apr. 18, 2014

(65) Prior Publication Data
US 2015/0300626 A1  Oct. 22, 2015

(51) Int. Cl.
F21L 4/00 (2006.01)
F21V 33/00 (2006.01)
F21W 111/10 (2006.01)

(52) U.S. Cl.
CPC .............. *F21V 33/008* (2013.01); *F21L 4/00* (2013.01); *F21W 2111/10* (2013.01)

(58) Field of Classification Search
CPC ...... F21V 33/008; F21L 4/00; F21W 2111/10
USPC .......................... 362/190, 459, 473, 367, 154
See application file for complete search history.

(56) References Cited

U.S. PATENT DOCUMENTS

| 5,145,138 A * | 9/1992 | Schlanger et al. ......... 248/311.2 |
| 2009/0145942 A1* | 6/2009 | Rice ......................... B62J 11/00 224/419 |
| 2014/0286012 A1 | 9/2014 | Chuang |

FOREIGN PATENT DOCUMENTS

CN  201484558 U  5/2010

OTHER PUBLICATIONS

English Translation of CN201484558U May 26, 2010.*

* cited by examiner

*Primary Examiner* — Anh Mai
*Assistant Examiner* — Glenn Zimmerman
(74) *Attorney, Agent, or Firm* — Alan D. Kamrath; Kamrath IP Lawfirm, P.A.

(57) ABSTRACT

An illuminated water bottle cage includes a cage forming a receiving space for a water bottle and including a bottom and a backing extending from a top edge of the bottom. The backing includes two barriers on two respective lateral sides thereof. The bottom, the backing, and the two barriers delimit the receiving space. An illuminating device engages with the cage and includes an illuminating member. The illuminating member in use projects light rays in a direction toward the receiving space.

10 Claims, 7 Drawing Sheets

ILLUMINATED WATER BOTTLE CAGE

BACKGROUND OF THE INVENTION

1. Field of the Invention

The present invention relates to a water bottle cage and, in particular, to an illuminated water bottle cage with an illuminating device projecting light rays in a receiving space of the water bottle cage.

2. Description of the Related Art

China Patent No. CN201484558 shows a water bottle cage and an illuminating unit engaging with the water bottle cage. The water bottle cage has a carrying portion delimiting a receiving space for a water bottle. At night, the illuminating unit can be used to project a light on the water bottle cage. However, there is a desire to provide an illuminated water bottle cage that can really have a warning light effect when needed, without a need of a high lumen light.

The present invention is, therefore, intended to obviate or at least alleviate the problems encountered in the prior art.

SUMMARY OF THE INVENTION

According to the present invention, an illuminated water bottle cage includes a cage forming a receiving space for a water bottle and including a bottom and a backing extending from a top edge of the bottom. The backing includes two barriers on two respective lateral sides thereof. The bottom, the backing, and the two barriers delimit the receiving space. An illuminating device engages with the cage and includes an illuminating member. The illuminating member in use projects light rays in a direction toward the receiving space.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

It is therefore an object of the present invention to provide an illuminated water bottle cage with an illuminating device projecting light rays into a receiving space of the water bottle cage.

It is another object of the present invention to provide an illuminated water bottle cage that has a warning light effect.

Other objects, advantages, and new features of the present invention will become apparent from the following detailed description of the invention when considered in conjunction with the accompanied drawings.

DETAILED DESCRIPTION OF THE INVENTION

Figure 1:
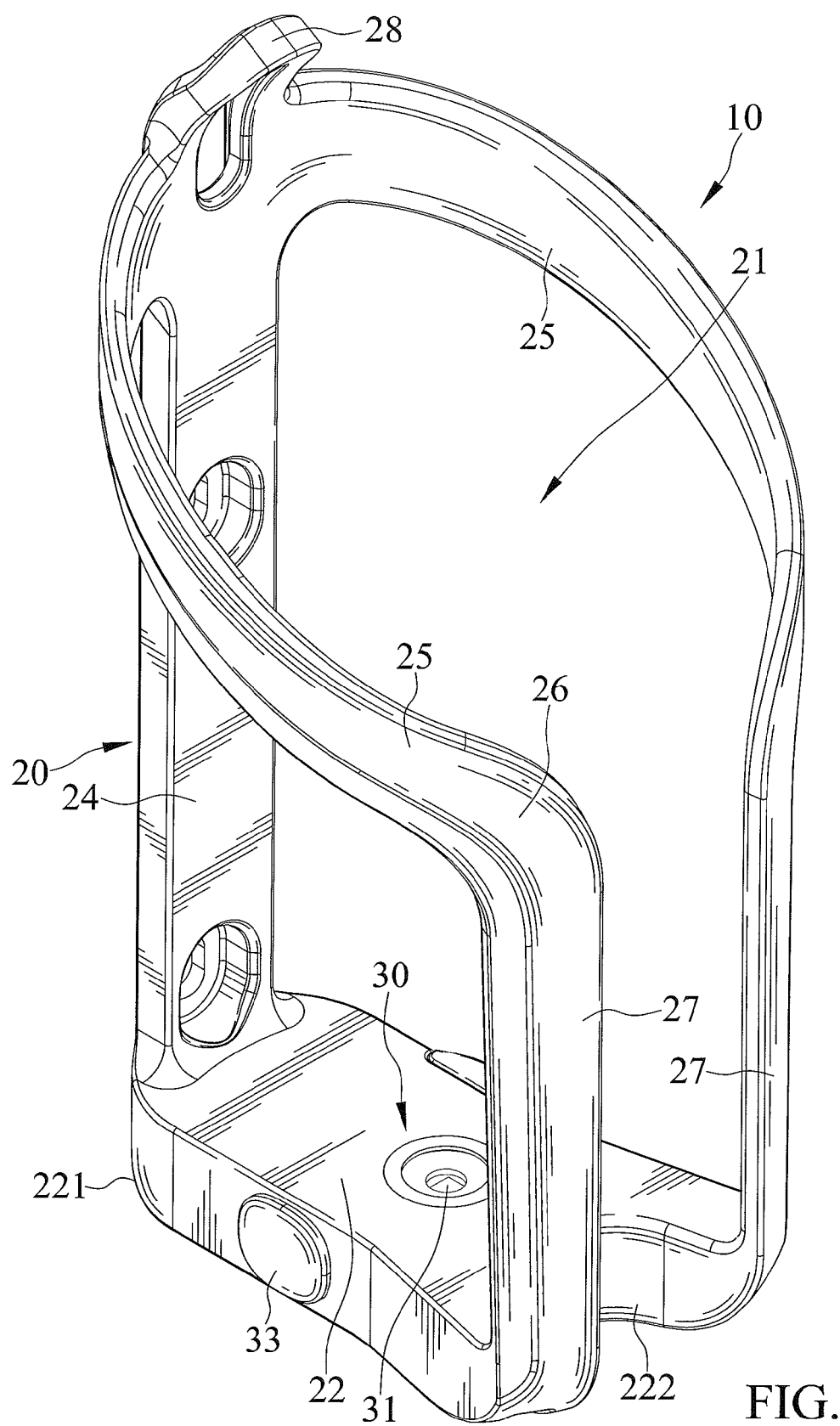
FIG. 1 is a perspective view of an illuminated water bottle cage in accordance with the present invention.
Figure 2:
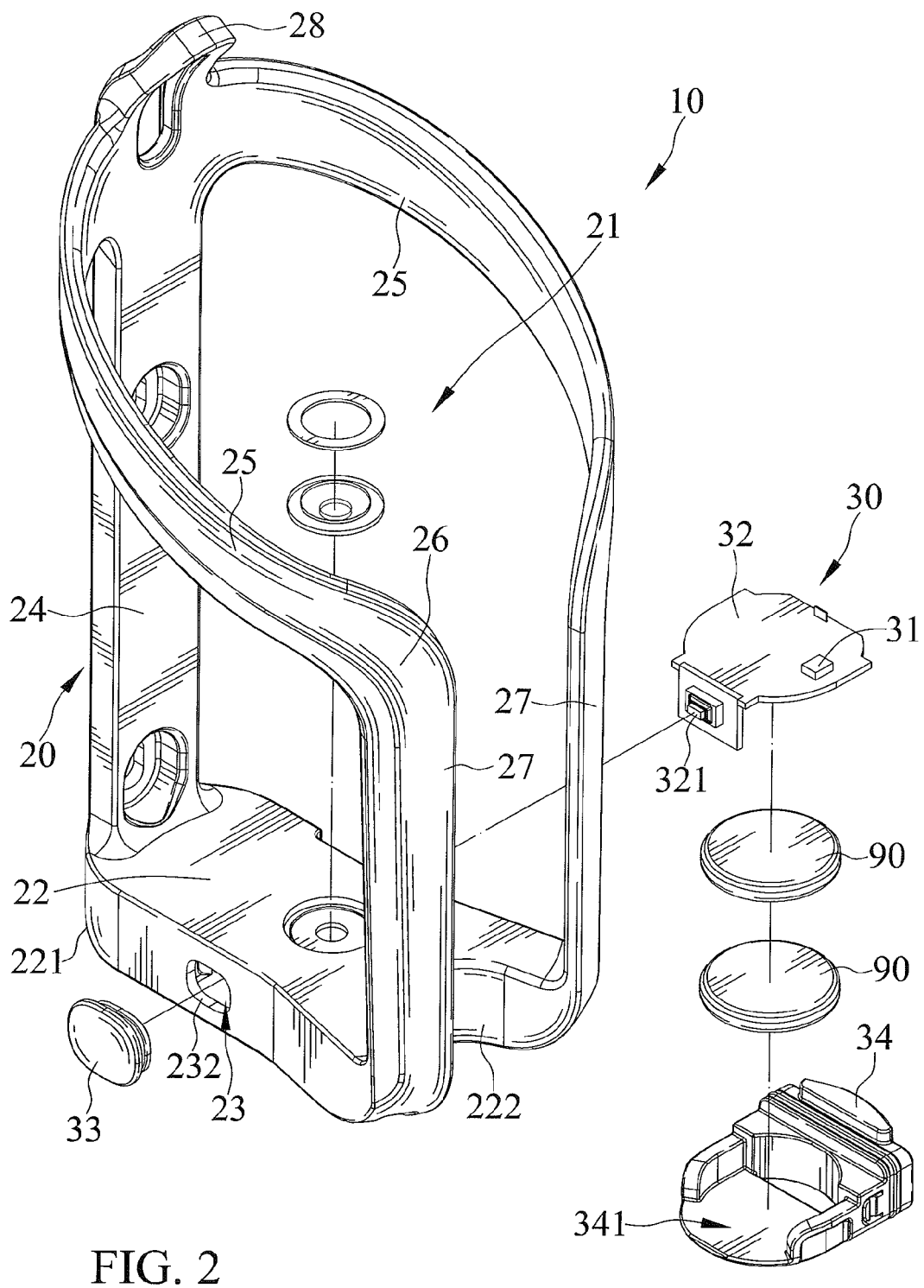
FIG. 2 is an exploded perspective view of the illuminated water bottle cage of FIG. 1.
Figure 3:
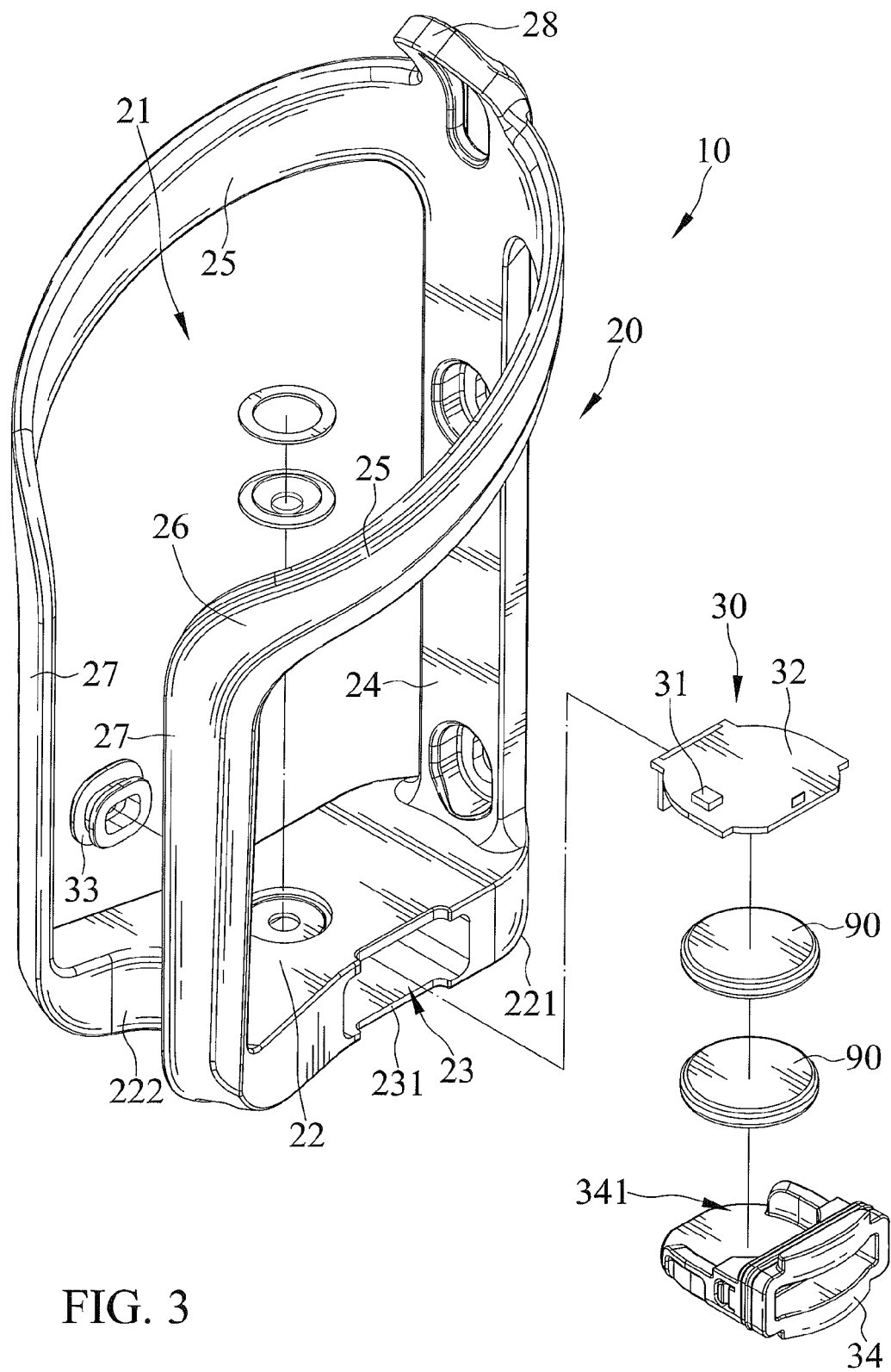
FIG. 3 is another exploded perspective view of the illuminated water bottle cage of FIG. 1.
Figure 4:
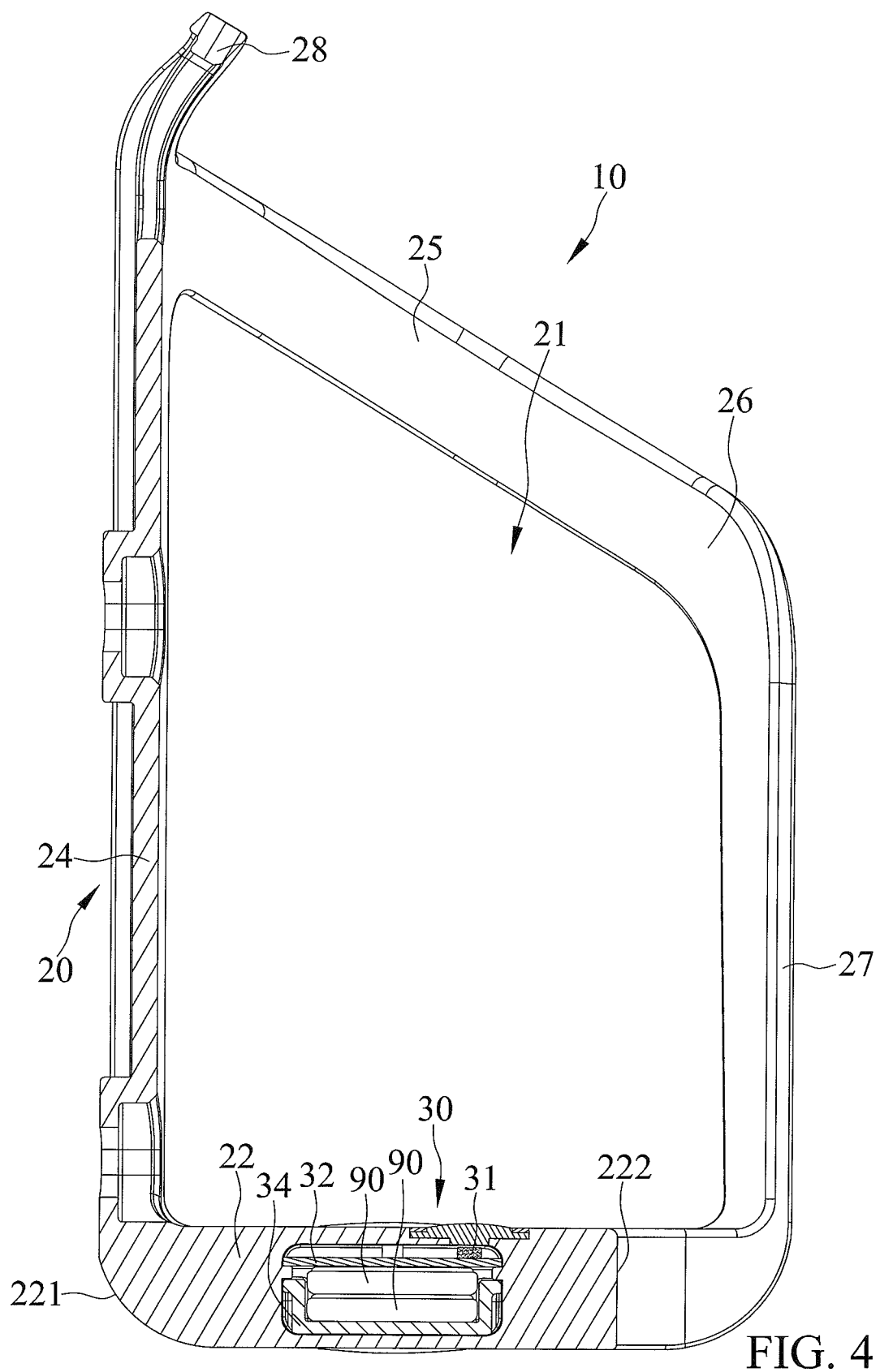
FIG. 4 is a cross-sectional view of the illuminated water bottle cage of FIG. 1.
Figure 5:
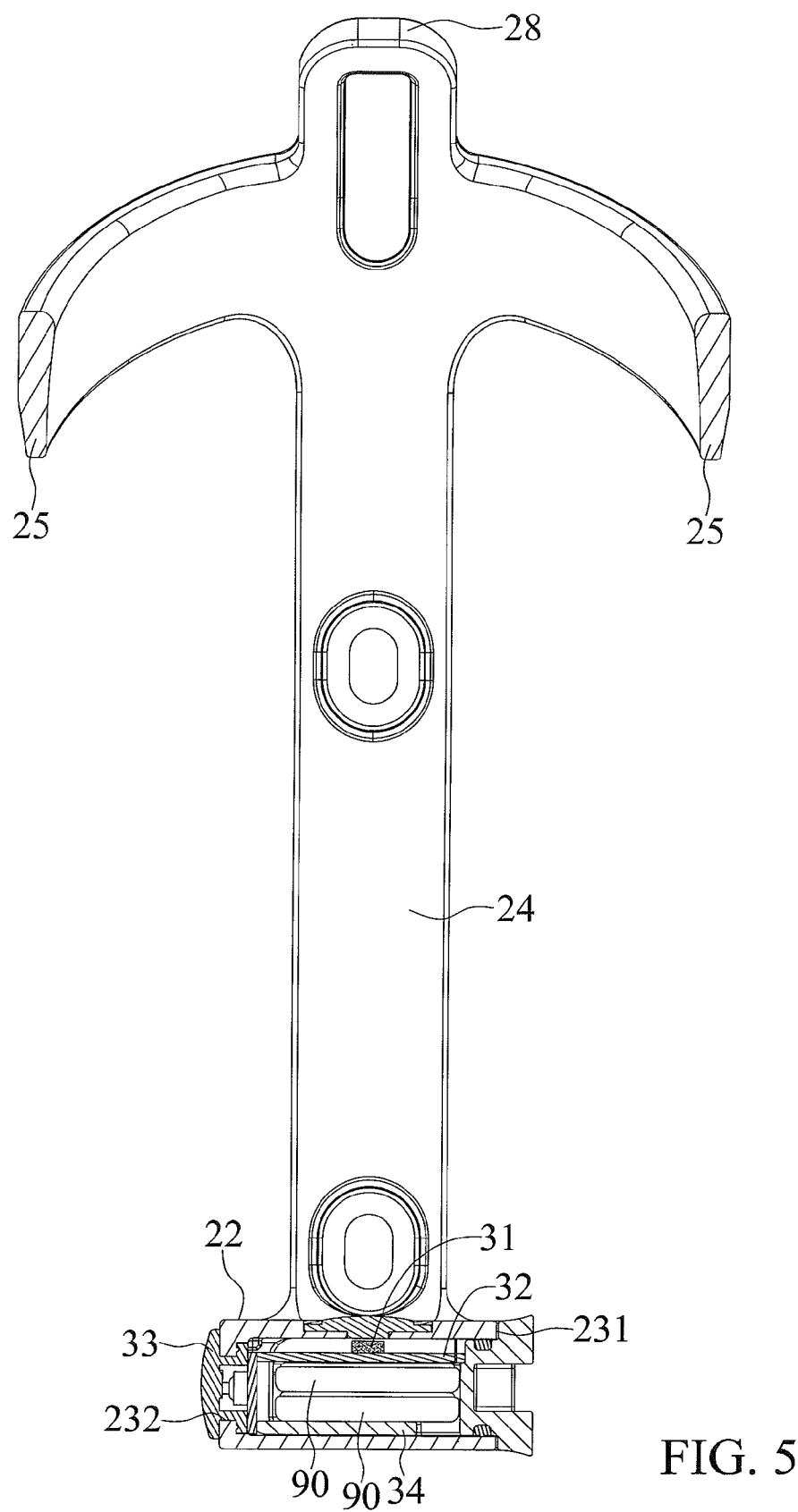
FIG. 5 is another cross-sectional view of the illuminated water bottle cage of FIG. 1.
Figure 6:
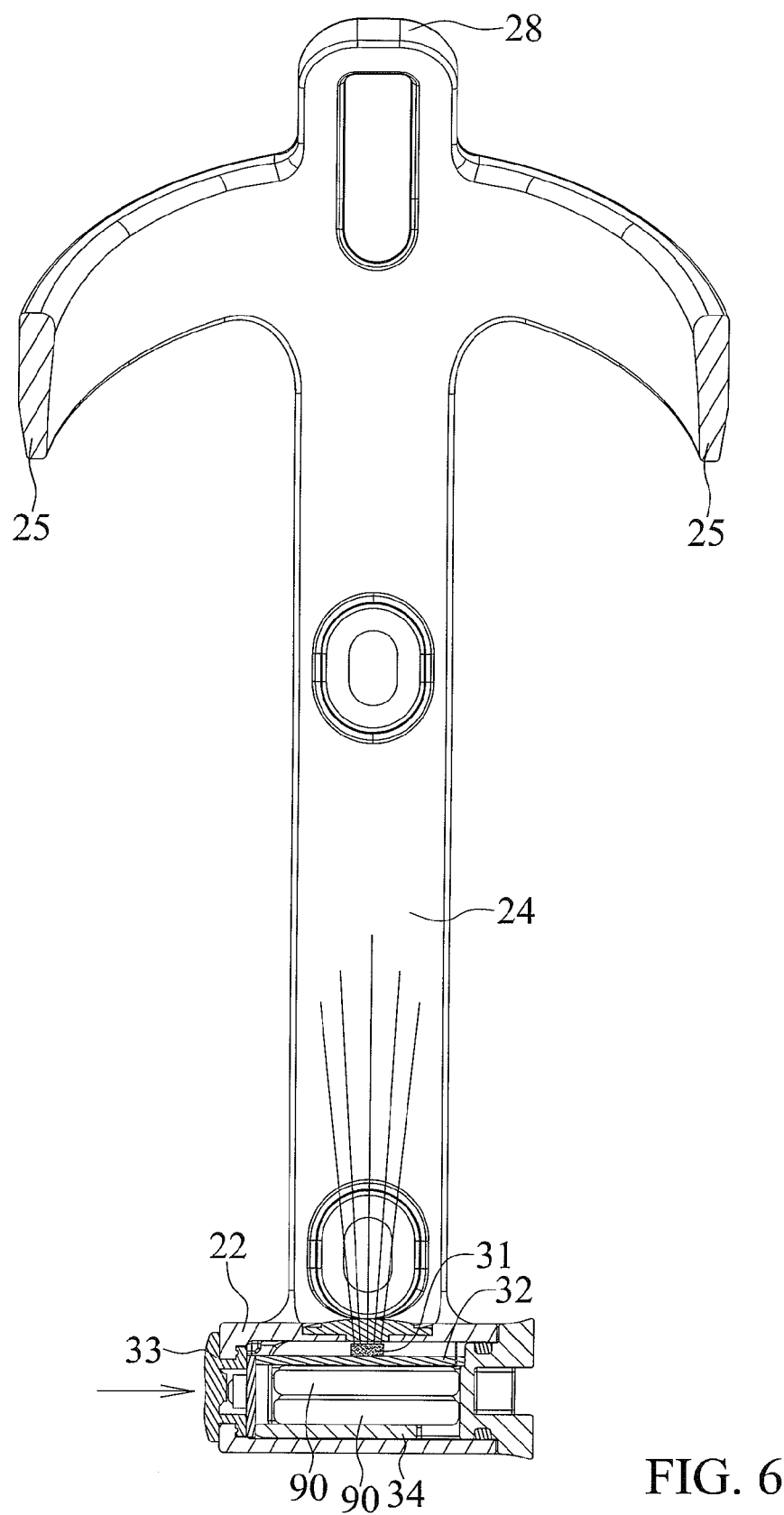
FIG. 6 illustrates an illuminating element of the illuminated water bottle cage of FIG. 1 in operation.
Figure 7:
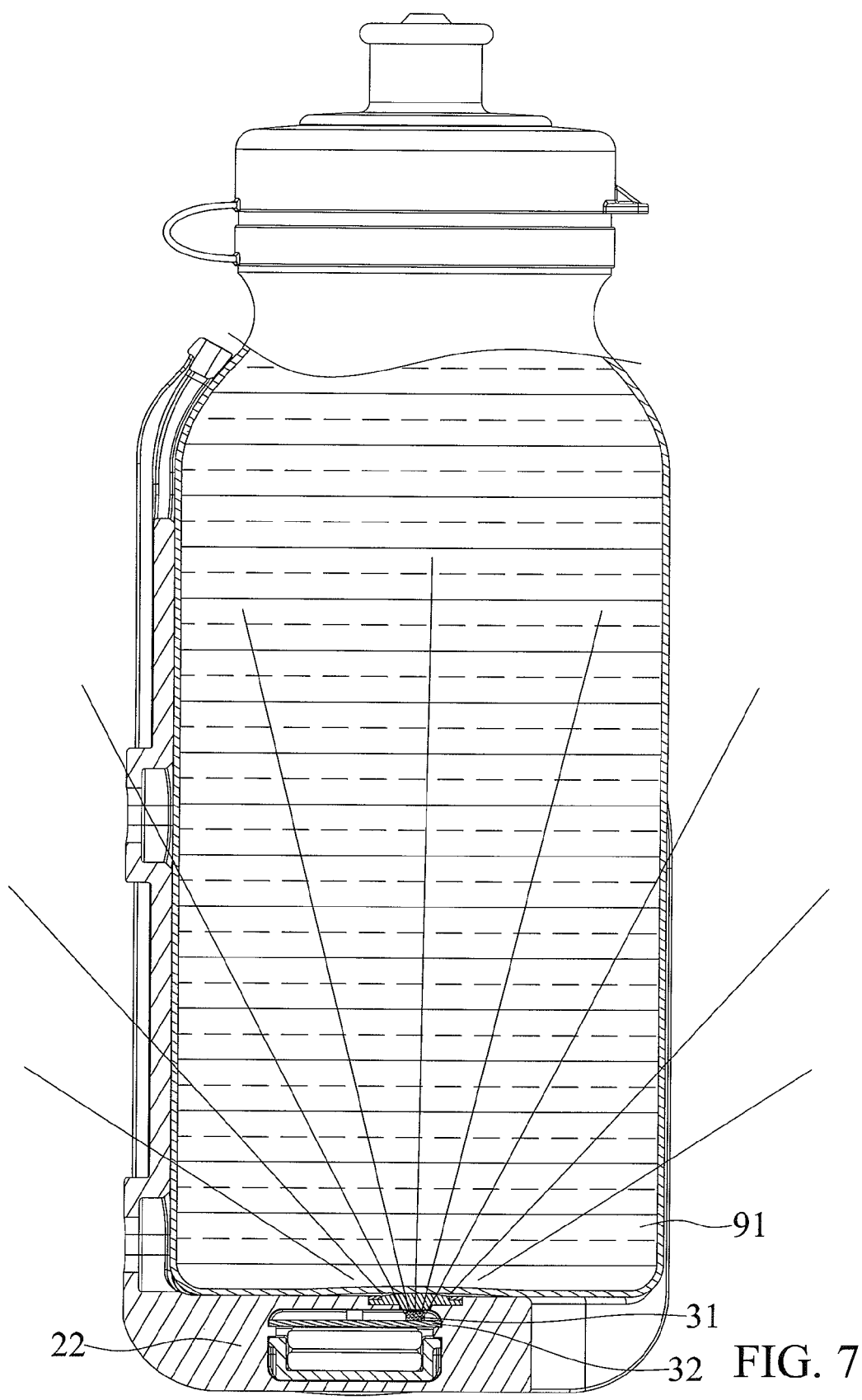
FIG. 7 illustrates the illuminated water bottle cage of FIG. 1 restraining a water bottle and including the illuminating element projecting light rays on the water bottle, with the water bottle glowing and liquid inside the water bottle reflecting the light rays.

FIGS. 1 through 7 show an illuminated water bottle cage 10 in accordance with the present invention. The illuminated water bottle cage 10 includes a cage 20 and an illuminating device 30.

The cage 20 forms a receiving space 21 for a water bottle 91 and includes a bottom 22 and a backing 24 extending from a top edge of the bottom 22. The bottom 22 of the cage 20 includes a recess 23. The recess 23 extends through two sides of the bottom 22 of the cage 20, with a first opening 231 disposed on one of the two sides and a second opening 232 disposed on the other of the two sides. The backing 24 includes two barriers 25 on two respective lateral sides thereof. The bottom 22, the backing 24, and the two barriers 25 delimit the receiving space 21. The receiving space 21 has two opposite ends and defines a depth between the two opposite ends. One end of the receiving space 21 is delimited by the top surface of the bottom 22 of the cage 20. The other end of the receiving space 21 is open. Therefore, the other end of the receiving space 21 defines an opening. The backing 24 is disposed adjacent to a first end 221 of the bottom 22 of the cage 20. Each of the two barriers 25 has a first length 26 extending in a direction toward a second end 222 of the bottom 22 of the cage 20 and in a circumferential direction of the receiving space 21. The first length 26 of each of the two barriers 25 is disposed above the top surface of the bottom 22 of the cage 20. Each of the two barriers 25 has a second length 27 continuing from the first length 26 thereof to the bottom 22 of the cage 20. The cage 20 includes a stop end 28 for holding down the water bottle 91, with the stop end 28 extending into the receiving space 21. The stop end 28 extends upwardly from the backing 24 of the cage 20.

The cage 20 is a one piece material.

The cage 20 is opaque.

The cage 20 is made of plastic.

The illuminating device 30 engages with the cage 20. The illuminating device 30 is disposed on a top edge of the bottom 22 of the cage 20. The illuminating device 30 includes an illuminating member 31. The illuminating member 31 in use projects light rays in a direction toward the receiving space 21. The illuminating device 30 includes a circuit board 32 and a pushbutton 33. The circuit board 32 is disposed in the recess 23 and electrically connects to the illuminating member 31. The circuit board 32 includes a switch 321 facing the second opening 232. The pushbutton 33 is disposed in the recess 23, is exposed from the second opening 232, and abuts against and interacts with the switch 321. The pushbutton 33 is a soft touch pushbutton. The illuminating device 30 includes a battery seat 34 with a storage space 341 for at least one battery 90. The battery seat 34 is disposed in the recess 23 and adjacent to the circuit board 32.

In view of the forgoing, the illuminating member 31 in use will project light rays in an upward direction and toward the receiving space 21. In addition, the light rays effectively make the water bottle 91 glow, and liquid inside the water bottle 91 reflects the light rays, thereby achieving a warning light effect.

What is claimed is:

1. An illuminated water bottle cage comprising:
   a cage forming a receiving space for a water bottle and including a bottom and a backing extending from a top edge of the bottom, with the backing including two barriers on two respective lateral sides thereof, with the bottom, the backing, and the two barriers delimiting the receiving space; and
   an illuminating device engaging with the cage and including an illuminating member, with the illuminating member in use projecting light rays in a direction toward the receiving space;
   wherein the illuminating device is disposed on a top edge of the bottom of the cage, wherein the receiving space has two opposite ends and defines a depth between the two opposite ends, and wherein one end of the receiving space is delimited by a top surface of the bottom of the cage.

2. The illuminated water bottle cage as claimed in claim 1, wherein the backing is disposed adjacent to a first end of the bottom of the cage, and wherein each of the two barriers has a first length extending in a direction toward a second end of the bottom of the cage and in a circumferential direction of the receiving space.

3. The illuminated water bottle cage as claimed in claim 1, wherein the cage is a one piece material.

4. The illuminated water bottle cage as claimed in claim 1, wherein the cage is opaque.

5. The illuminated water bottle cage as claimed in claim 1, wherein the cage includes a stop end for holding down the water bottle, with the stop end extending into the receiving space.

6. The illuminated water bottle cage as claimed in claim 2, wherein each of the two barriers has a second length continuing from the first length thereof to the bottom of the cage.

7. The illuminated water bottle cage as claimed in claims 4, wherein the cage is made of plastic.

8. The illuminated water bottle cage as claimed in claim 5, wherein the stop end extends upwardly from the backing of the cage.

9. An illuminated water bottle cage comprising:
   a cage forming a receiving space for a water bottle and including a bottom and a backing extending from a top edge of the bottom, with the backing including two barriers on two respective lateral sides thereof, with the bottom, the backing, and the two barriers delimiting the receiving space; and
   an illuminating device engaging with the cage and including an illuminating member, with the illuminating member in use projecting light rays in a direction toward the receiving space;
   wherein the bottom of the cage includes a recess, wherein the recess extends through two sides of the bottom of the cage, with a first opening disposed on one of the two sides and a second opening disposed on another of the two sides, wherein the illuminating device includes a circuit board and a pushbutton, wherein the circuit board is disposed in the recess and electrically connects to the illuminating member, wherein the circuit board includes a switch facing the second opening, and wherein the pushbutton is disposed in the recess, is exposed from the second opening, and abuts against and interacts with the switch.

10. The illuminated water bottle cage as claimed in claim 9 wherein the illuminating device includes a battery seat with a storage space for at least one battery, and wherein the battery seat is disposed in the recess and adjacent to the circuit board.

* * * * *